2 Sheets—Sheet 1.

I. & A. HERZBERG,

Assignors to the HOLMES BURGLAR ALARM TELEGRAPH CO.

Apparatus for Automatically Regulating the Flame of Gas-Burners.

No. 8,754. Reissued June 17, 1879.

Attest:
R. F. Barnes.
H. F. Newbury

Inventors:
Isaac Herzberg & Abram Herzberg
by Paul A. Duncan
Att'y.

I. & A. HERZBERG,

Assignors to the HOLMES BURGLAR ALARM TELEGRAPH CO.

Apparatus for Automatically Regulating the Flame of Gas-Burners.

No. 8,754. Reissued June 17, 1879.

Attest:
C. Clarence Poole
H. F. Newbury

Inventor:
Isaac Herzberg and Abram Herzberg
by Saml. A. Duncan
Att'y.

UNITED STATES PATENT OFFICE.

ISAAC HERZBERG AND ABRAM HERZBERG, OF PHILADELPHIA, PENNSYLVANIA, ASSIGNORS TO THE HOLMES BURGLAR ALARM TELEGRAPH COMPANY, OF NEW YORK CITY.

IMPROVEMENT IN APPARATUS FOR AUTOMATICALLY REGULATING THE FLAME OF GAS-BURNERS.

Specification forming part of Letters Patent No. 125,679, dated April 16, 1872; Reissue No. 8,754, dated June 17, 1879; application filed May 22, 1879.

DIVISION B.

*To all whom it may concern:*

Be it known that we, ISAAC HERZBERG and ABRAM HERZBERG, both of the city of Philadelphia and State of Pennsylvania, have invented certain new and useful Machinery or Apparatus for Automatically Regulating the Flame of Gas-Burners; and we do hereby declare the following to be a full, clear, and exact description of the same, reference being had to the accompanying drawings, making part of this specification, in which—

Figure 1:
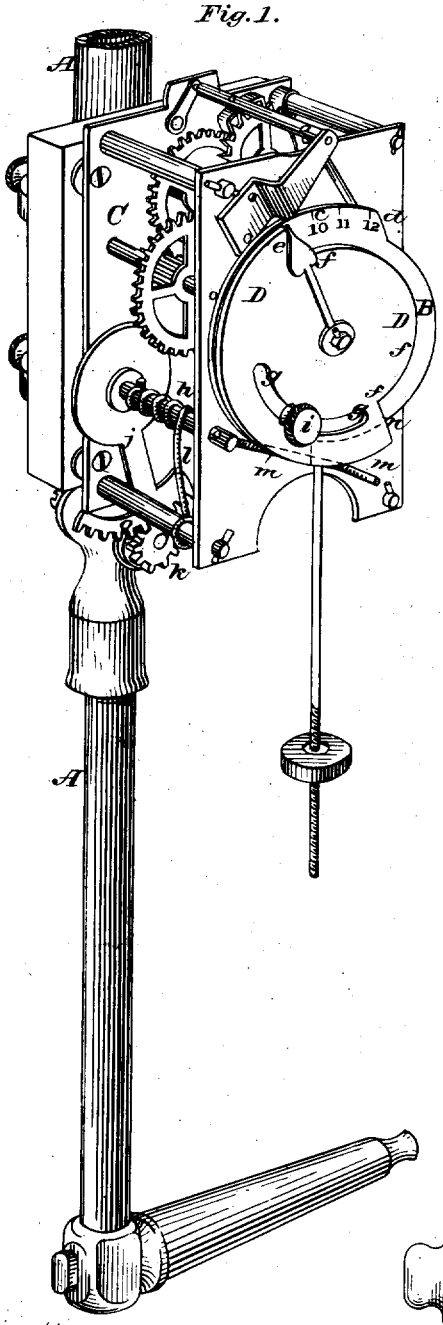
Figure 2:
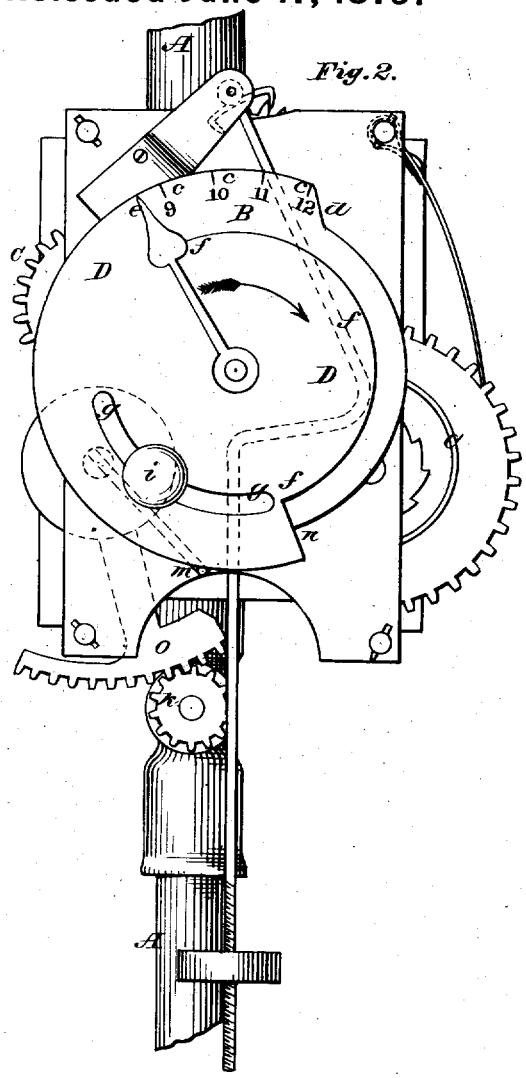
Figure 2:
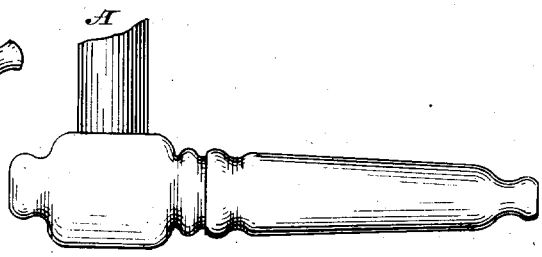
Figure 3:
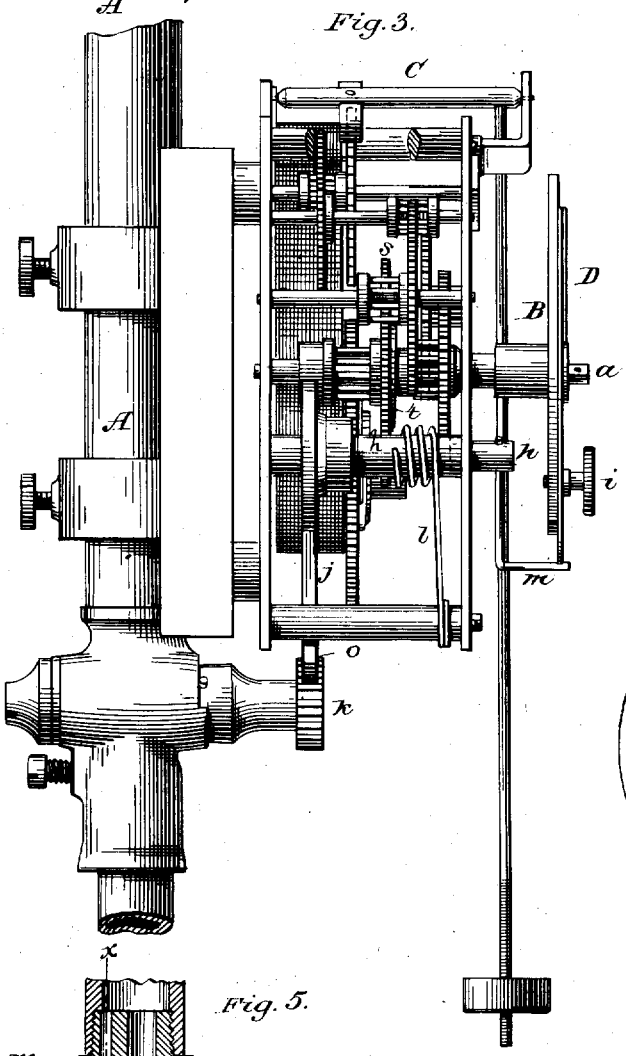
Figure 4:
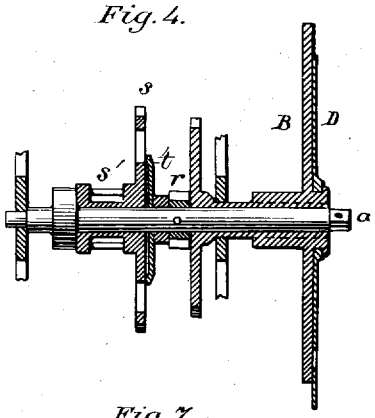
Figure 7:
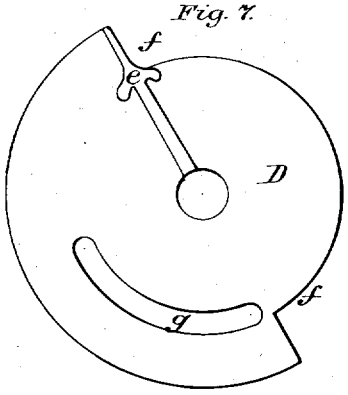
Figure 5:
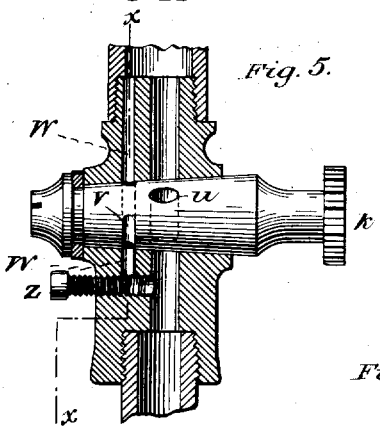
Figure 6:
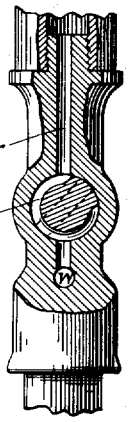
Figure 8:
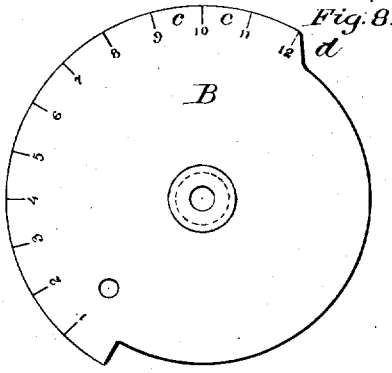

Figure 1 represents the invention in perspective. Fig. 2 is a front elevation of the same. Fig. 3 is a side elevation. Fig. 4 is a sectional view of the parts mounted on the main spindle or arbor of the time-movement, and specially designed to show the position of the frictional washer *n*. Fig. 5 is a sectional view of the pipe, showing the construction of the gas-passages and of the rotating block that constitutes the valve of the gas-cock. Fig. 6 is a sectional view at right angles to that shown in Fig. 5, and on the line *x x* of said figure. Figs. 7 and 8 are plan views, respectively, of the two disks or wheels B and D, which, when superimposed, make up the compound cam-wheel B D. (Shown in Figs. 1 and 2.)

Our invention relates to the combination, with a gas-cock, of a time-movement and suitable adjustable intermediate mechanism, whereby the action of the clock will at certain predetermined hours, capable of being changed at pleasure, periodically open and close the cock to any desired extent, and thus automatically regulate the flow of the gas.

Referring to the drawings, A represents any ordinary gas tube or pipe. On this pipe is arranged a clock or similar mechanism, C, which is driven by the expansion of a coiled or other spring.

This mechanism, being of a common and well-known construction, and shown in the drawings, need not be elaborately described.

The sleeve on the spindle *a*, however, which, in an ordinary clock, is the one upon which the hour-hand is placed, and there makes one revolution in twelve hours, in our construction is so geared as to make but one revolution in twenty-four hours. On this sleeve is mounted, so as to turn with it, a dial-plate or time-table, B, which has upon it hour-marks *c*, or marks representing divisions of an hour, and upon the perimeter of this time-table wheel there is a cam projection, *d*, designed for operating an oscillating lever, for a purpose hereinafter described.

This cam projection can be varied, within desired limits, by the following means: Over the sleeve of spindle *a*, but so that it may be turned independently of such sleeve when desired, there is placed a second circular plate or wheel, D, a portion of the perimeter of which is cut away, as at *f f*, the diameter of the remaining part being the same as that of the cam projection on the wheel B. This second plate is constructed with a concentric slot, *g*, and is provided with a set-screw, *i*, which passes through this slot and takes into the plate B, thereby enabling the two wheels to be clamped to each other in any desired relation that the extent of the slot *g* will permit, so that they will revolve together under the action of the clock or other driving gear or mechanism, and thus for the time be practically combined into one compound wheel. This capacity for relative adjustment possessed by the two wheels enables the common cam projection to be enlarged or diminished at pleasure, the common depression in the perimeters being at the same time correspondingly diminished or increased.

Pivoted in working relation to the compound wheel B D is the bent lever *h*, one arm of which, *m*, rides upon the perimeter of the wheel, being raised and sustained by the cam portion thereof, while the depressed part permits it to return to its former position, a spring, *l*, being used to produce this last action. The other arm, *j*, of this lever moves synchronously with the arm *m*, and carries a toothed sector-plate, *o*, which meshes with the cogged pinion *k*, that is attached directly to the valve or gate of the gas-cock. The size of this pinion is such that the throw of the lever, by the action of the time mechanism, will, at the predetermined hour, shift the valve of the gas-cock, and thus cut off or check the full supply of gas, and again, at a predetermined hour, remove the check and permit the gas to flow.

The plate D is provided with an indicator, *e*, which points to the marks denoting divisions of time upon the dial-plate B, and thus aids in effecting any desired adjustment of the two plates relatively to each other. The figures at *c* represent the number of hours that it may be desired to let the gas burn with a full flow—as, for instance, nine, ten, eleven, or twelve hours, or less or more—and by setting the pointer *e* upon any one of these figures the two plates will be so adjusted that the time required for the passage of the depressed portion of the perimeters, being the part from *d* to *n*, under the arm *m* of the lever *h*, will be the number of hours indicated by the pointer. When this portion of the perimeter is passing under the lever-arm the gas-cock is open; but when the cam portion of the perimeters is in contact with the lever-arm, the cock is turned so that the gas is shut off or reduced in volume.

It is plain to see that by turning the wheel B forward, as one would turn the hour-hand of an ordinary clock, the cam *d* can be made to begin its action upon the lever-arm *m* at any desired hour of the day; and as the distance from *d* to *n*, and consequently the length of the cam, can be regulated at pleasure, as above described, it follows that the apparatus is capable of being so set that it will automatically open the gas-cock at any desired hour, permitting the gas to flow and burn brightly for any predetermined number of hours, and then automatically shift the cock, so as to shut off or reduce the flow of gas for the remainder of the twenty-four hours, this operation being indefinitely repeated on the following and succeeding days, so long as the clock is kept wound up and the adjustments remain unchanged.

The compound cam-wheel B D is made readily adjustable relatively to the arm *m* by means of the spring-washer *t*, Fig. 4, which is placed on the arbor between the fixed pinion *r* and the wheel *s*. The friction of this spring-washer is such that under ordinary circumstances the rotation of the wheel *s* causes the pinion *r*, and through it the spindle or arbor and all the connected parts, to rotate correspondingly; but when a force is applied to the wheel B D sufficient to overcome the frictional resistance of the washer, the arbor will turn within the wheel *s* and pinion *s'* until the cam reaches the desired point, when, upon the cessation of the force thus applied, the parts will resume their normal action.

Instead of constructing the valve of the gas-cock with only a single perforation, *u*, passing directly through it, and intended to register with the main bore of the pipe, it may also be provided with a surface-groove, *v*, as shown in Figs. 5 and 6, constructed to register with the small side passage, *w*. This groove is so related to the perforation *u* that when the flow of gas through such perforation is entirely intercepted by the partial rotation of the valve a small supply will, if desired, be permitted to deliver through the side passage, *w*, and groove *v*, and even this can be regulated, as desired, by the adjusting-screw *z*, or by the same means entirely shut off.

It will be observed that the side passage, *w*, which leads out from the main passage of the gas-pipe below the cock, returns into such main passage again at a point a little above the cock, in which respect the construction differs from former constructions, in which the side passage leads to a separate burner.

What is claimed as new is—

1. The combination of a gas-cock, a time-movement, and a continuously-revolving device operated thereby and carrying an extensible cam, by means of which the cock can be opened and closed at predetermined hours, substantially as and for the purpose set forth.

2. The combination, with a time-movement, of the adjustable cam B D, the oscillating lever *h*, with its arms *m j* and spring *l*, the toothed sector-plate *o*, and pinion *k*, for the purpose of turning, or allowing to be turned, a gas-cock for shutting off or letting on the gas, and thus regulating its flow.

3. The combination, with a time-movement and suitable intermediate connecting mechanism, of a gas-cock and a gas-pipe having each two passages, one large and one small, arranged relatively to each other substantially as and for the purpose described.

ISAAC HERZBERG.
ABRAM HERZBERG.

Witnesses:
EUGEN WEISS,
H. F. NEWBURRY.